UNITED STATES PATENT OFFICE.

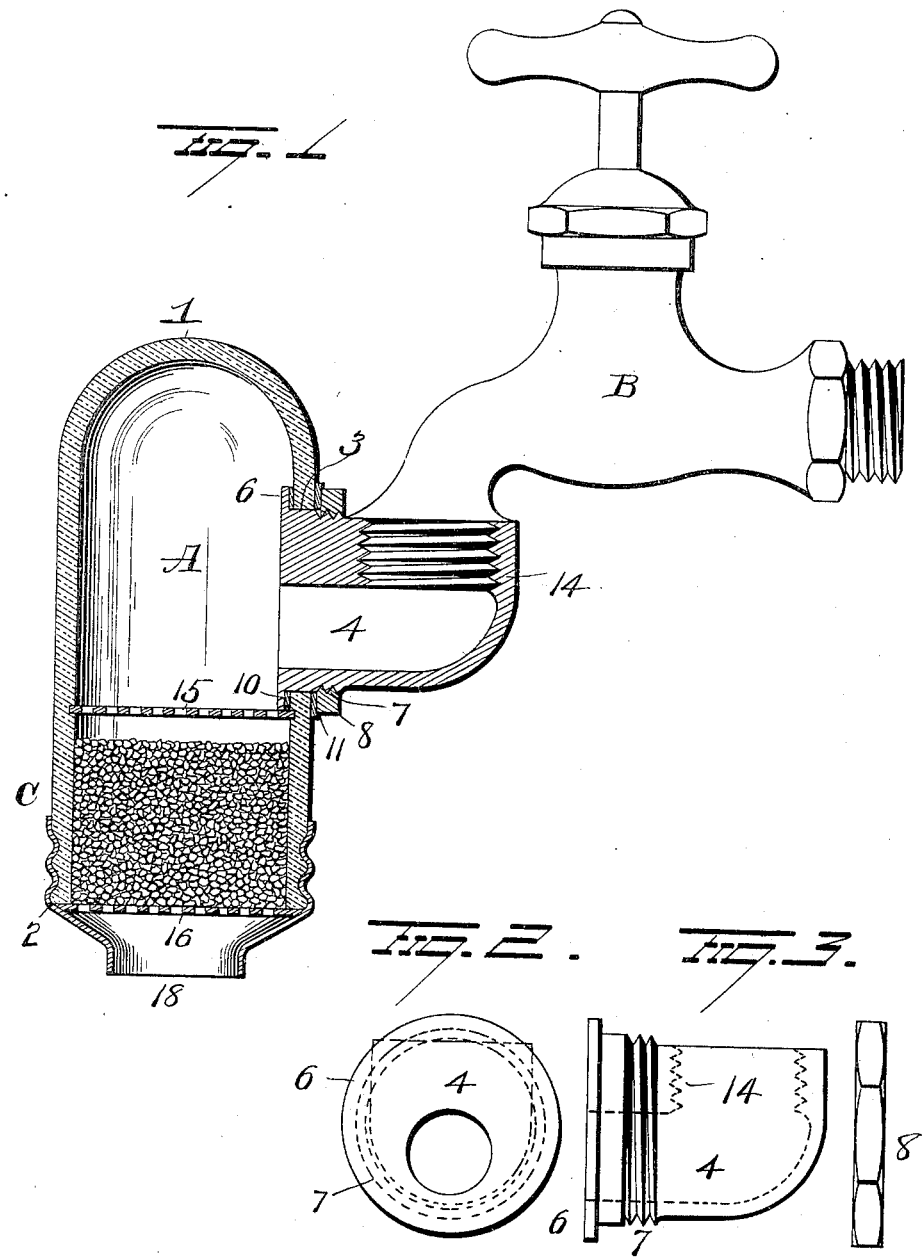

CHARLES R. HARRIS, OF WILLIAMSPORT, PENNSYLVANIA.

FILTER.

SPECIFICATION forming part of Letters Patent No. 674,763, dated May 21, 1901.

Application filed December 3, 1900. Serial No. 38,512. (No model.)

*To all whom it may concern:*

Be it known that I, CHARLES R. HARRIS, a resident of Williamsport, in the county of Lycoming and State of Pennsylvania, have invented certain new and useful Improvements in Filters; and I do hereby declare the following to be a full, clear, and exact description of the invention, such as will enable others skilled in the art to which it appertains to make and use the same.

My invention relates to an improvement in filters, and especially to that type applicable to faucets; and it consists mainly in provision for thoroughly disintegrating and clarifying the filtering medium without removal or dismemberment of the filter.

It further consists in certain organizations of mechanical details, which will be hereinafter fully described and explained.

In the accompanying drawings, Figure 1 is a view in side elevation, partly in section, and Figs. 2 and 3 are detached views of parts.

A represents the barrel or body portion of the filter. This may be of any approved form and material, and by preference I would construct it of glass in the form of a cylinder, dome-shaped at the upper end, as at 1, and open at the lower end and screw-threaded, as at 2. An opening 3 is formed also in one side about midway between the ends. The coupling 4, which joins the filter to the faucet B, is passed through this opening from the inside, it having an annular flange 6 at its inner end to hold it in place. The coupling is threaded on the exterior, as at 7, and a nut 8 on this thread is turned up tight against the body of the filter to hold the two parts together, and to insure a perfect water-tight joint rubber gaskets 10 and 11 may be interposed between the flange and the nut on each side of the barrel or body portion. The coupling is preferably in the form of an elbow, its opposite ends extending at right angles to each other, and if the faucet is one with a thread of course the coupling must have a corresponding thread 14 to screw on it. If the faucet has no thread, the coupling requires none. The construction must always be such that the nut may be removed over this smaller end. By this construction of coupling it will be observed that the water from the spigot discharges at first in a direction across the filter, so that its direct force is broken and never felt upon the contained filtering material.

C indicates the filtering substance. This may consist of gravel, charcoal, or any of the various substances usually employed for the purpose of filtering and purifying water. It is contained in the barrel between two perforated disks 15 and 16, which may be removably or otherwise held in place in the barrel or body portion. The outer disk 16 is retained in place by the nozzle 18, screwed on the threads 2 of the barrel.

The filtering substance is always loose in the chamber formed between the disks, it being supported by the lower one. The weight and pressure of the water upon the filtering material is sufficient to compact it together when in the position shown in the drawings and cause the water to be thoroughly filtered during its passage through.

To clean the filter, its position is reversed by simply turning it on the coupling as its center, and when inverted the filtering material drops apart and disintegrates, it being supported then upon the upper disk 15. The water then only stirs and washes the material, but does not compress it into compact space, because the water passes through in a direction opposite to that caused by the gravity of the material. Hence the material is washed and rinsed and easily and quickly placed in condition for further efficiency and utility. It is obvious that this cleansing would not result, or at any rate to so great a degree, if the filtering mixture were tight in its chamber. Hence it will be understood that the greatest benefit is derived by this looseness of the filtering material.

New material may be put in with the greatest ease, as can be readily seen, by simply removing the nozzle 18 and dropping out the material, and more can be put in with equal facility by inverting the barrel or body portion and pouring the material in. This can all be done without removing the filter from the spigot. It can be removed from the spigot, if need be, by turning it to a horizontal position and then unscrewing it.

The invention is a very simple one, and it is not only most efficient, but also is designed to be made so cheap that it will be within the means of every housekeeper, thus greatly augmenting the sanitary equipment of every well-appointed kitchen.

It is evident that changes might be made in the form and arrangement of the several parts described without departing from the spirit and scope of my invention, and hence I do not wish to limit myself to the exact construction herein set forth; but, Having fully described my invention, what I claim as new, and desire to secure by Letters Patent, is—

1. A filter comprising a body portion provided with a part to which it is swiveled and by which it is coupled to the supply and having an outlet at one end and an inlet between its ends and a filtering-chamber between said inlet and outlet, whereby water will normally pass downwardly through said filtering-chamber and whereby the water will pass upwardly through said filtering-chamber when the body portion is inverted on its support and result in loosening, cleansing and disintegrating the filtering material.

2. In a filter, the combination with a tubular support constituting an inlet for the filter, of a body portion pivotally mounted between its ends on said support and communicating therewith, said body portion having a filtering-chamber between the outlet thereof and the inlet formed by the tubular support, whereby the filtering material will be held compact when the water passes through it in the direction of the gravity of the filtering material and loosens, disintegrates and thoroughly cleans said material when the water passes through it in the opposite direction, substantially as set forth.

3. The combination with a tubular support, of a body portion mounted to turn on said tubular support and communicating therewith, said body portion closed at one end and having an outlet at the other end, two perforated disks located in the body portion between the tubular support and outlet and spaced apart and filtering material between said disks, substantially as set forth.

4. In a filter, the combination with a barrel closed at one end and open at the other and having an inlet-opening between its ends, of a perforated disk below the inlet-opening, filtering material on said disk and a nozzle on the open end of the barrel and serving to support said disk and filtering material, substantially as set forth.

5. In a filter, the combination with a body portion adapted to be normally disposed vertically and to discharge at its lower end, said body portion having an inlet-opening in its side, of a hollow support having openings at right angles to each other, one end of said support adapted to pass through the inlet-opening in the side of the body portion and having a flange to bear against the inner wall of said body portion and a nut adapted to screw on said support and bear against the outer wall of said body portion, substantially as set forth.

6. In a filter, the combination of a coupling, and body portion pivotally connected together, the body portion normally disposed in a vertical position and in a horizontal position when screwed on or off the spigot to which it is adapted to be secured.

In testimony whereof I have signed this specification in the presence of two subscribing witnesses.

CHAS. R. HARRIS.

Witnesses:
R. F. ALLEN,
E. G. WILHELM.